United States Patent
Barton et al.

(10) Patent No.: US 7,933,950 B1
(45) Date of Patent: Apr. 26, 2011

(54) SECURE CONTROL OF FEATURES OF A DIGITAL DEVICE

(75) Inventors: Michael Barton, Littleton, CO (US); Richard Lee, San Francisco, CA (US); J. Eric Townsend, Palo Alto, CA (US); Adam Feder, Mountain View, CA (US); Timothy Davison, San Francisco, CA (US); Paul Stevens, Felton, CA (US); James Barton, Alviso, CA (US)

(73) Assignee: TiVo Inc., Alviso, CA (US)

( * ) Notice: Subject to any disclaimer, the term of this patent is extended or adjusted under 35 U.S.C. 154(b) by 748 days.

(21) Appl. No.: 10/958,642

(22) Filed: Oct. 4, 2004

Related U.S. Application Data

(60) Provisional application No. 60/508,769, filed on Oct. 2, 2003.

(51) Int. Cl.
  G06F 15/16 (2006.01)
  H04N 7/173 (2006.01)
  H04N 7/167 (2006.01)
  H04L 9/32 (2006.01)

(52) U.S. Cl. ........ 709/203; 709/201; 709/202; 709/204; 709/205; 709/206; 709/207; 709/227; 709/228; 709/229; 725/31; 725/86; 713/170

(58) Field of Classification Search .................. 709/228; 725/86
  See application file for complete search history.

(56) References Cited

U.S. PATENT DOCUMENTS

| | | | |
|---|---|---|---|
| 5,448,045 A | 9/1995 | Clark | |
| 5,475,839 A | 12/1995 | Watson et al. | |
| 5,875,444 A | 2/1999 | Hughes | |
| 5,919,257 A | 7/1999 | Trostle | |
| 5,944,821 A | 8/1999 | Angelo | |
| 6,061,449 A | * 5/2000 | Candelore et al. | 380/28 |
| 6,092,189 A | 7/2000 | Fisher et al. | |
| 6,189,100 B1 | 2/2001 | Barr et al. | |
| 6,247,139 B1 | 6/2001 | Walker et al. | |
| 6,263,431 B1 | 7/2001 | Lovelace et al. | |
| 6,292,569 B1 | 9/2001 | Shear et al. | |
| 6,327,652 B1 | 12/2001 | England et al. | |
| 6,367,012 B1 | 4/2002 | Atkinson et al. | |

(Continued)

OTHER PUBLICATIONS

Samarati et al.; "An authorization model for a public key management service"; ACM Transactions on Information and System Security vol. 4, Issue 4 (Nov. 2001).*

(Continued)

Primary Examiner — Andrew Caldwell
Assistant Examiner — Lin Liu
(74) Attorney, Agent, or Firm — Kirk D. Wong; Hickman Palermo Truong & Becker LLP

(57) ABSTRACT

A method providing secure control of features of a digital device. In one embodiment, the method comprises sending, from a digital device that participates in a service, to a service provider that provides the service, a request to participate in the service; receiving a digital message that identifies a service state for the digital device, wherein the digital message is encoded uniquely for the digital device, wherein the digital message is unusable at a different digital device; based on the digital message, determining a plurality of control values that collectively define the service state within the digital device; and providing the control values to one or more applications hosted by the digital device that deliver a service experience associated with the service, or a feature, to an end user of the digital device.

16 Claims, 10 Drawing Sheets

U.S. PATENT DOCUMENTS

| | | | |
|---|---|---|---|
| 6,381,741 B1 | 4/2002 | Shaw | |
| 6,853,731 B1 * | 2/2005 | Boyle et al. | 380/268 |
| 6,976,165 B1 | 12/2005 | Carpentier et al. | |
| 7,231,516 B1 * | 6/2007 | Sparrell et al. | 713/156 |
| 7,231,525 B1 | 6/2007 | Beuque | |
| 2002/0044658 A1 * | 4/2002 | Wasilewski et al. | 380/239 |
| 2002/0059620 A1 * | 5/2002 | Hoang | 725/87 |
| 2002/0073311 A1 * | 6/2002 | Futamura et al. | 713/157 |
| 2003/0192060 A1 * | 10/2003 | Levy | 725/133 |
| 2003/0219127 A1 * | 11/2003 | Russ et al. | 380/239 |
| 2004/0261126 A1 * | 12/2004 | Addington et al. | 725/135 |

OTHER PUBLICATIONS

Kravitz-D-W; "Aspects of digital rights management and the use of hardware security devices."; Financial Cryptography. 5th International Conference, FC 2001. Proceedings (Lecture Notes in Computer Science vol. 2339), 2002.*

* cited by examiner

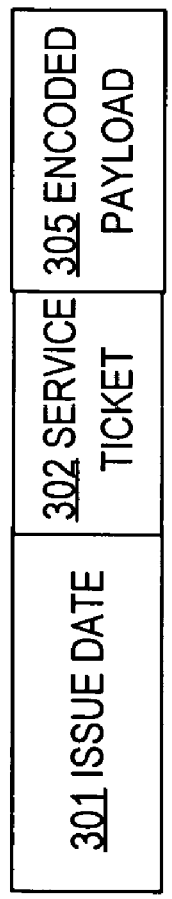

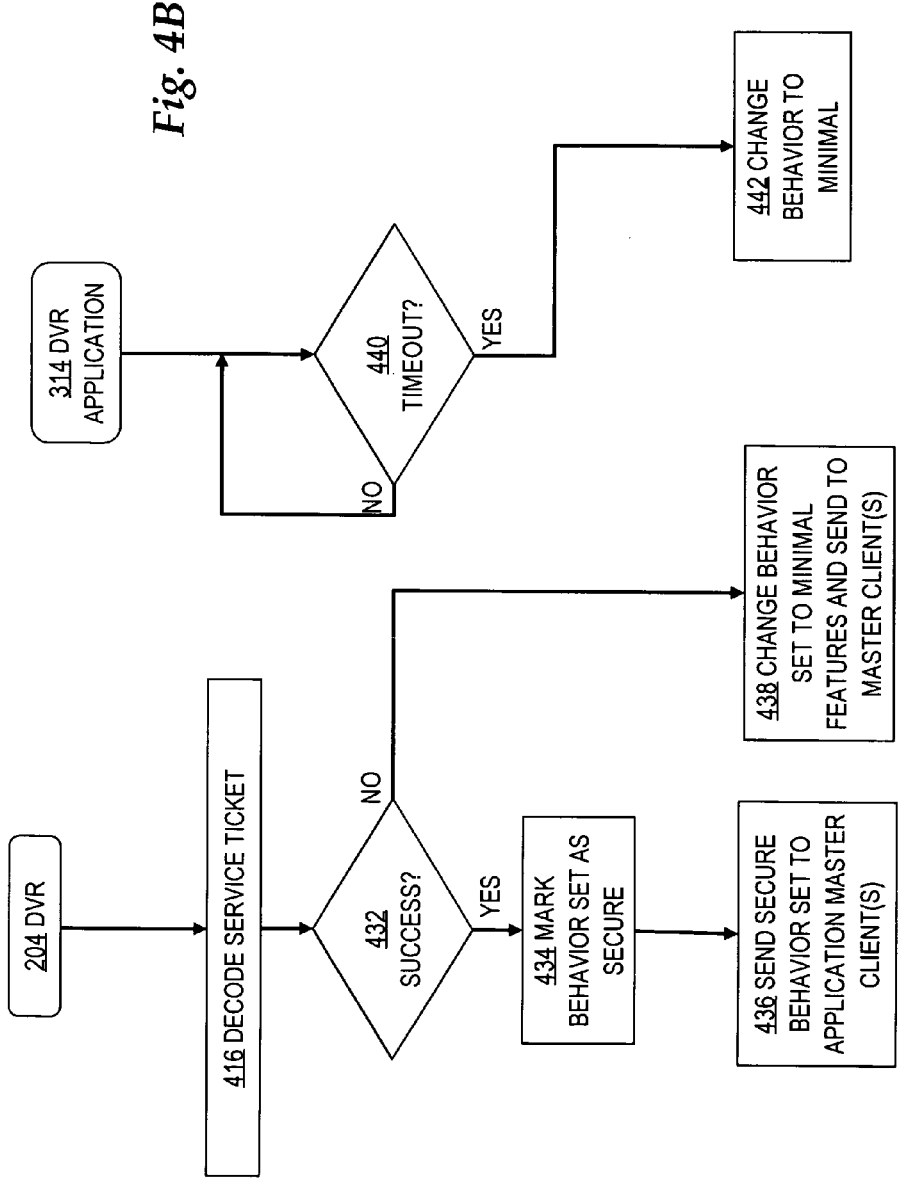

SECURE CONTROL OF FEATURES OF A DIGITAL DEVICE

CROSS-REFERENCE TO RELATED APPLICATIONS

Priority Claim

This application claims domestic priority under 35 U.S.C. §119(e) from prior provisional Appln. 60/508,769, filed Oct. 2, 2003, the entire contents of which is hereby incorporated by reference as if fully set forth herein. This application is related to U.S. Pat. No. 7,409,546 issued on Aug. 5, 2008 (prior Appln. 10/189,079, filed Jul. 2, 2002), the entire contents of which is hereby incorporated by reference as if fully set forth herein.

COPYRIGHT NOTICE

A portion of this disclosure includes information that may be subject to copyright protection. The patent owner has no objection to the facsimile reproduction of this document as it appears in the records of the U.S. Patent & Trademark Office, but reserves all other rights whatsoever. Copyright © 2004 TiVo, Inc.

FIELD OF THE INVENTION

The present invention generally relates to digital data processing. The invention relates more specifically to techniques for providing secure control over enabling and disabling features of a digital device.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many efforts have been made to deliver television programming over computer networks, such as the Internet, or even over a local cable television plant operating as a network. The point-to-point nature of computer networks makes these efforts unwieldy and expensive, since additional resources are required for each additional viewer. Fully interactive television systems, where the viewer totally controls video streaming bandwidth through a client set-top device, have proven uneconomical because dedication of server resources to each client quickly limits the size of the system that can be profitably built and managed.

However, television viewers show a high degree of interest in choice and control over television viewing. Currently, the majority of Digital Video Recorder (DVR) devices are client set-top devices that provide television viewers with the choice and control over television viewing that they desire. These are products that receive and record to a hard drive, a large amount of audio/video content (television broadcasts, satellite-TV broadcasts, cable-TV broadcasts, and direct downloads of program materials via the Internet). A commercial example is the TiVo Series 2 DVR, from TiVo, Inc., of Alviso, Calif.

DVR systems may receive and store audiovisual content that has substantial commercial value—first-run and pay-per-view movies, special sporting events, and so forth. The right to record and view such material is usually granted under a license of some sort, and such use-licenses typically have limits. The person buying a use-license to such material is typically not granted permission to make or distribute copies of the material, and in some cases is not permitted to record and replay ("time-shift") the material at all. In many DVR products, the right to use the DVR features themselves (e.g., program guides, programmed or manual recordings, time-shifting, etc.) is subject to a monthly or other service fee.

Further, DVR devices may be offered with different levels of service or different features that are available only if the user pays an enhanced service fee or higher purchase price. For example, a particular DVR device may be capable of interfacing to another DVR device in a different location to provide multi-room viewing. With multi-room viewing, a person in one room having a first DVR can command a second DVR to deliver content recorded on the second DVR from the second DVR to a first DVR. Further, a DVR device may offer playback or sharing of digitally recorded music. A person who pays a first fee may be entitled to use these services whereas a person who pays a second, lower fee may not be entitled to use these services. Some of these services may be provided through interaction of the DVR with a server that is logically separated from the DVR by a computer network.

Because of the commercial value of content recorded on a DVR, and the commercial value of different levels of services or features, a DVR may be an attractive target for people who seek to avoid the licensing and service fees, or who wish to make copies of the content recorded on the system. Others may seek to activate features of the DVR, or services provided over the network by a service provider, without paying for them.

Many of the methods for accomplishing such subversion involve changing the software and data stored on the DVR. A "pirate" might, for example, try to modify or "patch" the DVR software, or change the contents of an internal database, so that the DVR will interact with a network server or service provider provide a service for which the pirate has not paid. A pirate might also attempt to activate a feature of the DVR for which the pirate has not paid. A "hacker" might attempt to open the DVR and install new software or modify existing software or data to enable particular features.

To deter such attacks, the DVR must not execute any software that provides features or service activated by an unauthorized party or for which a user has not paid. To prevent such execution the DVR needs a way to determine what features or services the DVR is authorized to deliver to the user. Advantages would be provided by a method of securely enabling or disabling features on the DVR or securely informing the DVR what features or services to provide to a user.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3B is a block diagram of data structures that may be used in an embodiment;

FIG. 4B is a flow diagram that illustrates further steps in the method of FIG. 4A;

DETAILED DESCRIPTION

A method and apparatus for secure control of features of a digital device is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | General Overview |
| 2.0 | Structural and Functional Overview |
| | 2.1 Database Of Television Viewing Information |
| | 2.2 System and Method for Secure Control of Features of a Digital Device |
| 3.0 | Example Embodiments of Secure Control of a Digital Device |
| | 3.1 DVR Service Provider Example |
| | 3.2 Satellite Service Provider Example |
| | 3.3 Information Incorporated by Reference |
| 4.0 | Methods that Generate Revenue for a Service Provider |
| 5.0 | Implementation Mechanisms-Hardware Overview |
| 6.0 | Extensions and Alternatives |

1.0 General Overview

The needs identified in the foregoing Background, and other needs and objects that will become apparent for the following description, are achieved in the present invention, which comprises, in one aspect, a method for secure control of features of a digital device comprising sending, from a digital device that participates in a service, to a service provider that provides the service, a request to participate in the service; receiving a digital message that identifies a service state for the digital device, wherein the digital message is encoded uniquely for the digital device, wherein the digital message is unusable at a different digital device; based on the digital message, determining a plurality of control values that collectively define the service state within the digital device; and providing the control values to one or more applications hosted by the digital device that deliver a service experience associated with the service, or a feature, to an end user of the digital device.

In other aspects, the invention encompasses a computer apparatus and a computer-readable medium configured to carry out the foregoing steps.

2.0 Structural and Functional Overview

A system and method for secure control of features of a digital device are now described in general terms that may be used in one embodiment.

2.1 Database of Television Viewing Information

Figure 1:
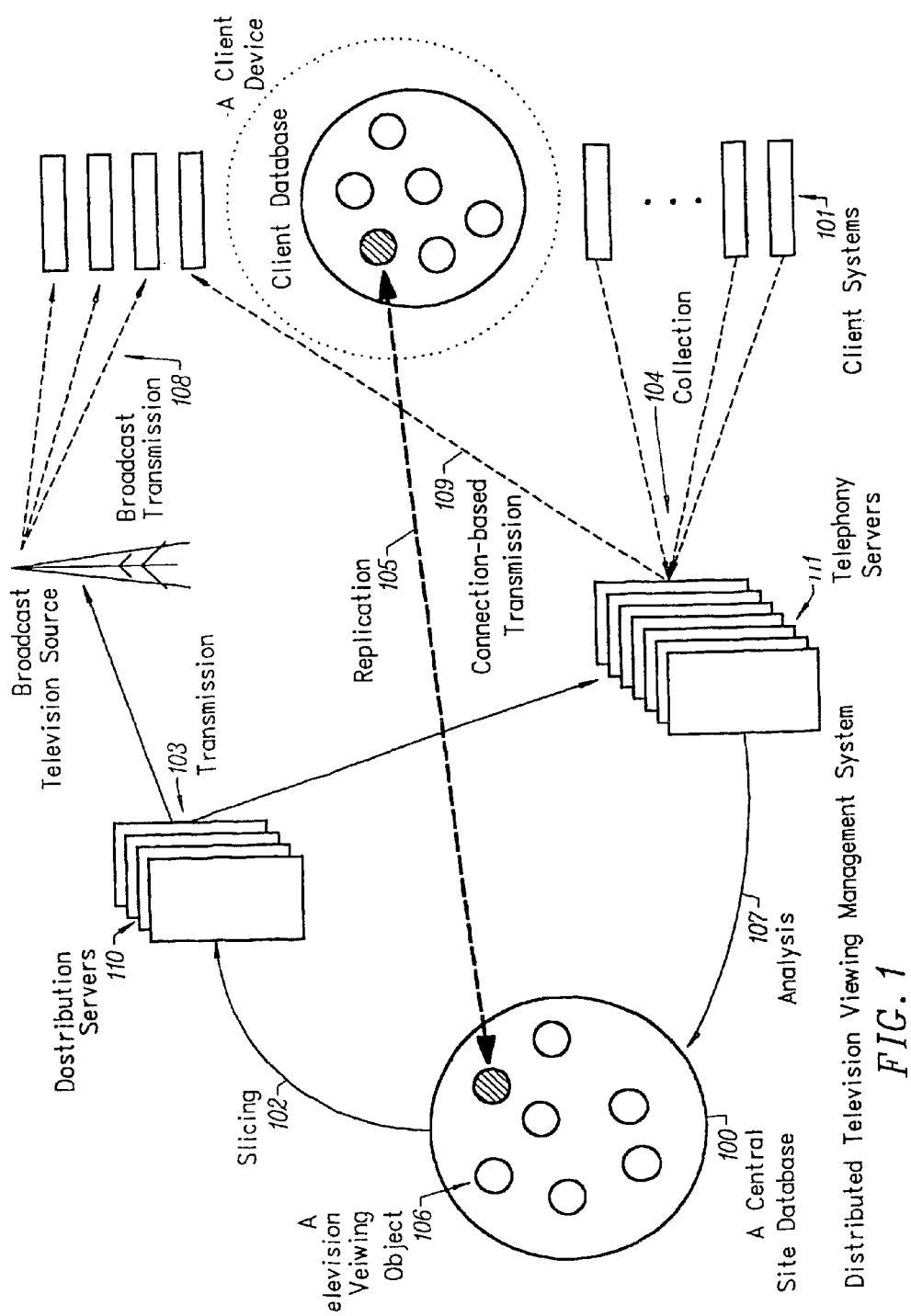
FIG. 1 is a block diagram of a distributed television viewing management system.

FIG. 1 is a block diagram of a distributed television viewing management system. A distributed database of television viewing information is maintained among computer systems at a central site 100 and an extremely large number of client computing systems 101. The process of extracting suitable subsets of the central copy of the database is called "slicing" 102, delivering the resulting "slices" to clients is called "transmission" 103, delivering information collected about or on behalf of the viewer to the central site is called "collection" 104, and processing the collected information to generate new television viewing objects or reports is called "analysis" 107; in all cases, the act of recreating an object from one database within another is called "replication" 105. Data items to be transmitted or collected are termed "objects" 106, and the central database and each replicated subset of the central database contained within a client device is an "object-based" database. The objects within this database are often termed "television viewing objects", "viewing objects", or simply "objects", emphasizing their intended use. However, one skilled in the art will readily appreciate that objects can be any type of data.

The viewing object database provides a consistent abstract software access model for the objects it contains, independent of and in parallel with the replication activities described herein. By using this interface, applications may create, destroy, read, write and otherwise manipulate objects in the database without concern for underlying activities and with assurance that a consistent and reliable view of the objects in the database and the relationships between them is always maintained.

2.2 System and Method for Secure Control of Features of a Digital Device

Figure 2:
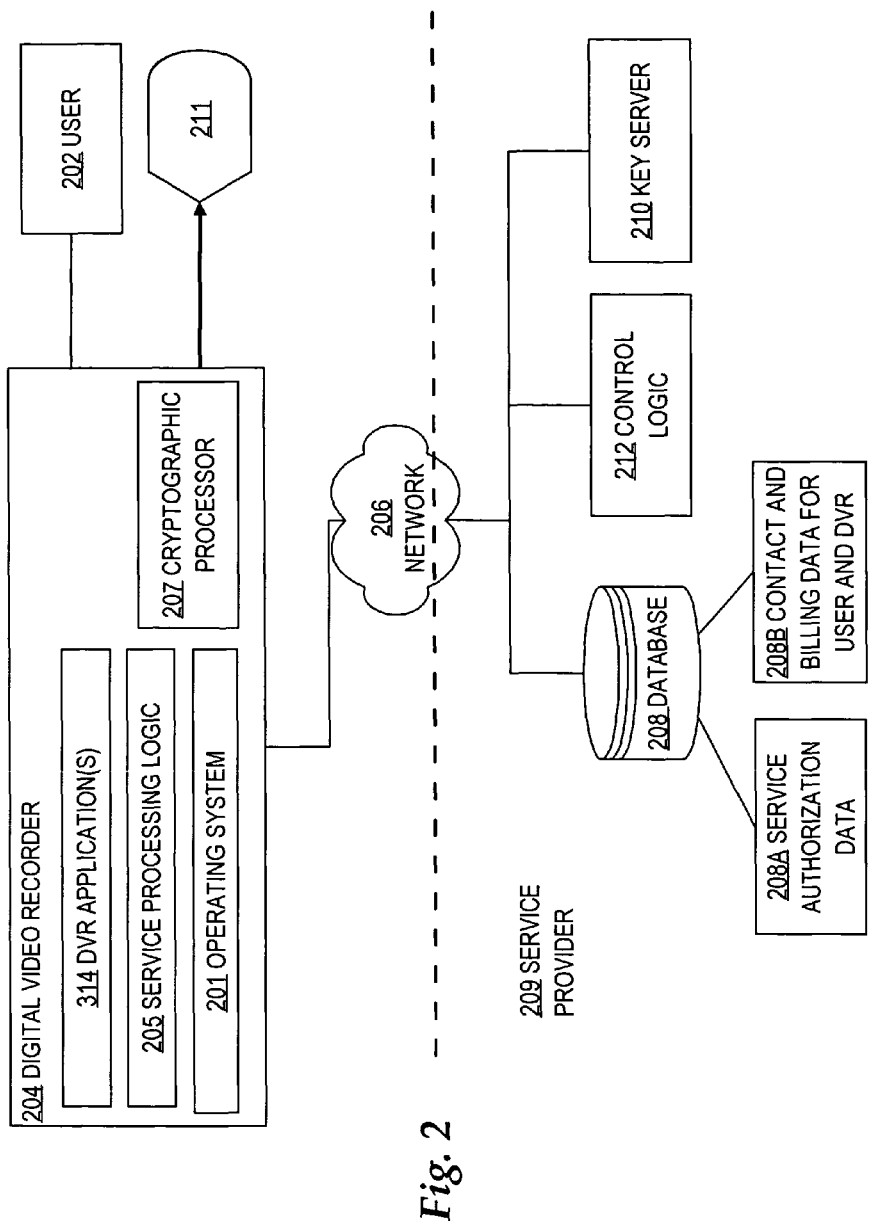
FIG. 2 is a block diagram of a system that may be used for secure control of features of a digital device.

FIG. 2 is a block diagram of a system that may be used for secure control of features of a digital device. A user 202 owns, operates, or is otherwise associated with a digital video recorder (DVR) 204 that can display broadcast, satellite, or cable television programs, menu displays, and other information on a display device 211, such as a television or monitor. In one embodiment, DVR 204 may comprise a TiVo Series 2 DVR from TiVo, Inc., of Alviso, Calif. DVR 204 is communicatively coupled to a network 206 that links the DVR to a service provider 209. For example, DVR 204 periodically connects to service provider 209 by placing a call through the public switched telephone network to the service provider. A call server at the service provider receives the call and communicates with the DVR 204 by exchanging digital information using a modem. Alternatively, DVR 204 communicates with service provider 209 over a digital packet network such as the Internet.

DVR 204 comprises an operating system 201, service processing logic 205, a cryptographic processor 207, and one or more applications 314. Operating system 201 supervises operation of the DVR 204 and applications 314. Service processing logic 205 comprises one or more computer programs or other software elements that implement the processes disclosed herein. Applications 314 implement specific services or features of the DVR such as selecting programs to record, re-configuring the DVR, playing music downloads, etc.

Cryptographic processor 207 comprises one or more hardware or software elements that can decrypt messages received from service provider 209 or encrypt messages for sending to the service provider. In one embodiment, cryptographic processor comprises an Atmel embedded security device, such as part number AT97SC3201, having firmware that stores or has embedded a private encryption key unique to the DVR.

Service provider 209 comprises a database 208, key server 210 and control logic 212. In one embodiment, database 208, key server 210, and control logic 212 are hosted on separate computers or servers; in an alternative embodiment, these elements may be co-hosted. Database 208 stores service authorization data 208A and contact and billing data 208B for user 202 and DVR 204. In other embodiments, database 208 may store administrative information for support of the processes described herein. Authorization data 208A may include accounting information, activation records, service state information, etc.

Key server 210 performs encryption and digital signing of service tickets, as described further herein, based on keys that are generated by other system elements, to facilitate securely communicating the service tickets to DVR 204. Control logic 212 comprises one or more computer programs or other software elements that implement the processes described herein.

For purposes of illustrating a clear example, FIG. 2 depicts only one DVR 204; however, in a practical embodiment, millions of DVRs 204 may be used. In one embodiment, the system of FIG. 2 implements public key cryptography techniques for message communication between service provider 209 and DVR 204. In this embodiment, a public key-private key pair is created for each DVR at the time that the DVR is manufactured. The private key is stored persistently and securely in DVR 204, and key server 210 stores the public key corresponding to each private key for each DVR in the system.

Further, in one embodiment, key server 210 uses a signing key for use in digitally signing certain data that is communicated from service provider 209 to the DVR 204. The use of the digital signing key is described further below.

According to one embodiment, secure control of features of a digital device is provided in the following general way. DVR 204 comprises one or more applications that implement features that can be turned on or off under software control. For example, the applications and features may be data-driven by data structures that identify the features and indicate whether the features are turned on or off.

Upon initial installation or at another future time, DVR 204 calls service provider 209 and connects to control logic 212. The control logic receives information indicating a than-current state of the DVR 204. The control logic determines a correct new state for the DVR 204, based on what features, services or products a user has purchased. The control logic creates an encrypted data structure, which may be termed a "ticket," that holds information from which the features, services or products can be derived. The control logic packages the ticket securely and sends it to the DVR 204.

Upon receiving the ticket, the DVR 204 decodes the ticket and determines what features, services or products are represented in the ticket. The DVR 204 builds a list of control values that indicate specific capabilities of the DVR 204 that are enabled, disabled, or set to particular values depending on the features, services or products represented in the ticket. One or more applications hosted by the DVR 204 access the control values to implement the features, services or products.

Although a preferred embodiment applies the foregoing general techniques to digital video recorders, in other embodiments, the techniques disclosed herein may be used to provide secure control of any kind of digital device. Examples of digital devices that can be controlled using these techniques include personal computers, workstations, personal digital assistants, cellular radiotelephones, other mobile wireless devices, or any other device, vehicle or appliance that contains any of the foregoing.

3.0 Example Embodiments of Secure Control of a Digital Device

3.1 DVR Service Provider Example

Figure 3A:
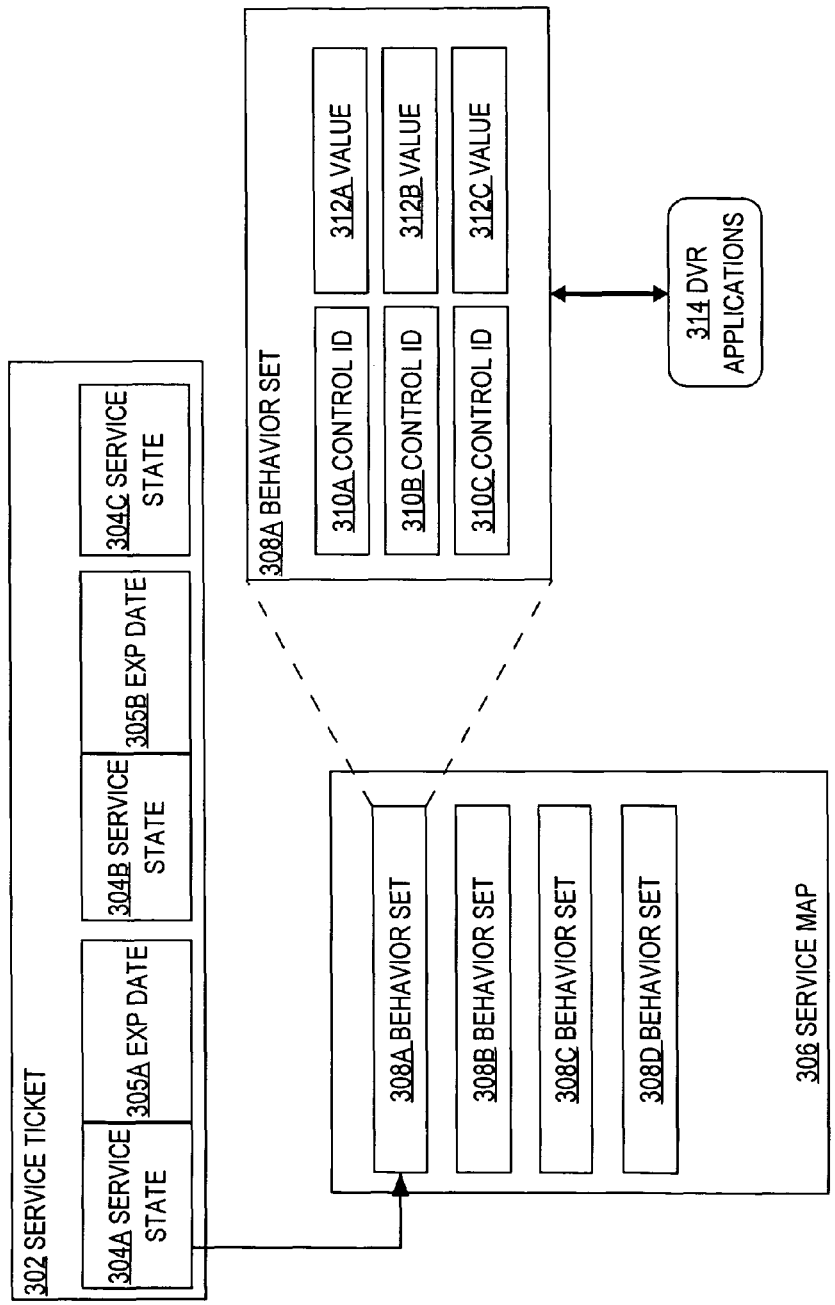
FIG. 3A is a block diagram of data structures that may be used in an embodiment.
Figure 4A:
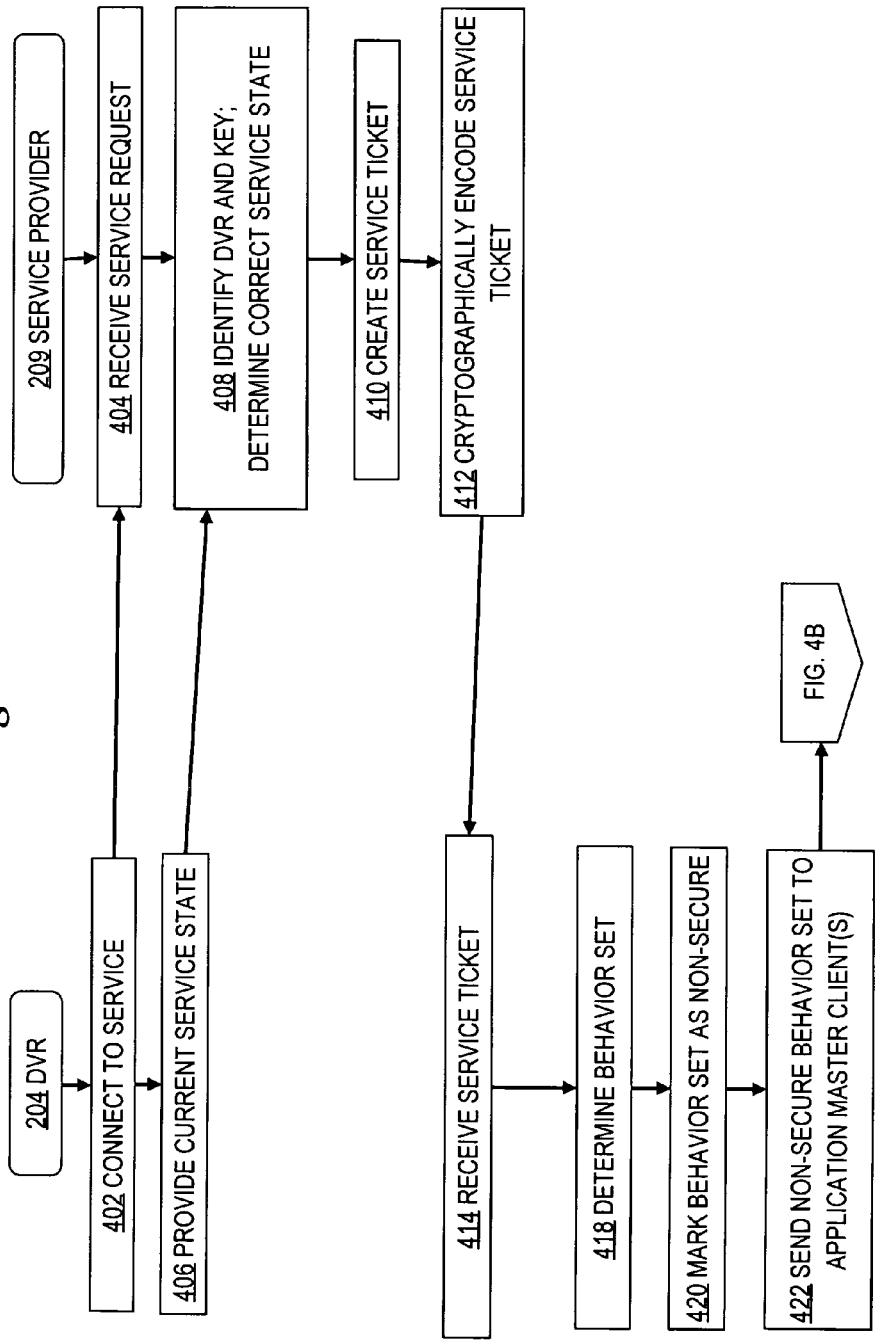
FIG. 4A is a flow diagram of one embodiment of a method for secure control of features of a digital device.

FIG. 4A is a flow diagram of one embodiment of a method for secure control of features of a digital device; FIG. 4B is a flow diagram that illustrates further steps in the method of FIG. 4A; and FIG. 3A is a block diagram of data structures that may be used in an embodiment.

Referring first to FIG. 4A, in step 402, DVR 204 connects to a service provider 209 that provides features and services for the DVR 204. The particular features and services provided by service provider 209 are not critical. Examples of features and services include program guide information, maintenance information, digital music delivery, movies on demand, etc. In one specific embodiment, DVR 204 is a TiVo Box or Series 2 DVR from TiVo, Inc., and service provider 209 is TiVo, Inc. Connecting in step 402 may involve sending one or more digital messages from DVR 204 to service provider 209.

In step 404, the service provider receives a service request from the DVR. The service request may comprise a digital message that encapsulates general request for updated service information, so that an updated service ticket is implicitly requested, or an explicit request to receive a new service state or service ticket. For example, the DVR 204 periodically connects to the service provider 209 and requests updated program guide information. As part of the service request, the DVR may provide a digital message with its current service state, as shown in step 406. In this context, "service state" is a number or other digital value that represents a particular set of one or more features, services or products. Throughout this description, the term "service level" is equivalent to "service state."

In one embodiment, the service state provided at step 406 is encapsulated in a service ticket that is sent from the DVR to the service provider. FIG. 3A is a block diagram of data structures that may be used in an embodiment, comprising a service ticket 302, service map 306, and one or more behavior sets 308A, 308B, etc. The service ticket 302 carries information that can communicate, from service provider 209 to DVR 204, what services or features the DVR is authorized to use.

The service map 306 maps service state values to one or more behavior sets 308A, 308B, etc. that comprise values specifically controlling how features, services or products are implemented in the DVR. The service map 306 additionally may comprise a count value indicating the number of behavior sets in the service map, a name of the service map, an expiration date, or other metadata.

A behavior set is a cohesive and internally consistent collection of values that an application can test to tailor its behavior to provide a particular level of service. In one embodiment, for example, behavior set 308A comprises one or more control identifiers 310A, 310B, etc. and corresponding control values 312A, 312B, etc. Control identifiers specify program variables, values or settings which, when used by DVR applications 314, cause the DVR to implement particular features, services or products. For example, control ID 310A may be "Home Media Option On" and value 312A may be "True." Such a control ID and value instructs the DVR to implement a service or feature known as Home Media Option. As another example, if a "Season Pass Manager" feature is not allowed, a corresponding value may be 0; if the feature is enabled, the value is 1. If a particular service state has a limit on the number of Season Passes that a user may have, then a control identifier 310A could be "NumSeasonPassMax" and value 312A could represent the number of allowed Season Passes. In still another embodiment, a value 312A may be treated as a string of a plurality of bits in which each bit signifies whether a feature is on or off; this approach may provide a more compact service map 306. In one embodiment, values 312A, 312B, etc. are Boolean values or 32-bit integer values. However, any other form of data representation may be used for the values.

Further, a behavior set 308A could be named "Full Service," "Minimal Service," "A," "B," or other values that indicate a level of service or range of services, products or features that are provided by the control values that make up that behavior set.

A service map 306 may use inheritance principles of object-oriented programming techniques so that one behavior set 308B can reference or include one or more control values of another behavior set 308A. A behavior set that references another behavior set can override control values of the referenced behavior set by declaring new values for the overridden control values.

In one embodiment, the service ticket 302 comprises a first service state 304A, first expiration date 305A, second service state 304B, second expiration date 305B, and third service state 304C. The first service state 304A identifies a first set of features, services or behavior for the DVR 204, and the first expiration date 305A specifies when that first set expires. When a clock in DVR 204 reaches the first expiration date 305A, the DVR re-configures itself to use the service state represented by the second service state 304B. If the second expiration date 305B is reached, the DVR re-configures itself to use the third service state 304C. The third service state 304C has no expiration date; the DVR remains in the third service state until it receives a new, valid service ticket from the service provider.

In one embodiment, the first service state represents an initial full-service state, the second service state represents a more limited service state that is used for warning purposes, and the third service state represents a minimal service state. For example, in the third service state the DVR 204 may be unable to perform any functions or provide any features, services or products, other than connecting to the service provider 209 to obtain a new service ticket. This approach enables the DVR 204 to combat piracy or attacks by denying an unauthorized user any features, services, or products unless the DVR connects to the service provider 209 and the service provider determines that the user has paid for and is authorized to use the features, services or products.

Any number of service states may be represented in service ticket 302. The service states 304A, 304B, 304C may have any useful or appropriate value or data representation. The expiration date values 305A, 305B may have any useful or appropriate value. Example values are 20 hours, a few weeks, etc.

Referring again to FIG. 4A, in step 408, the service provider 209 identifies the DVR 204 and a key associated with the DVR. For example, each DVR 204 persistently stores a value that uniquely identifies it, and provides the unique identifier in the service request received at step 404. In step 408, the service provider 209 looks up or otherwise determines a public key that is uniquely associated with the DVR 204, based on the unique identifier. In later steps, the service provider 209 can use the public key to perform public key encryption operations on data sent to the DVR 204.

In step 410, a new service ticket is created. As part of step 410, service provider 209 determines, from database 208, what features, products or services user 202 has purchased or is authorized to use. For example, database 208 stores a record for user 202 that contains a service state value for the level of service paid for or otherwise authorized for the user. Based on the record in the database, the service provider creates a service ticket in the form of service ticket 302 (FIG. 3A) that includes a service state value 304A for the user's authorized service level.

In an alternative embodiment, step 410 may involve modifying an expiration date of a service ticket, effectively extending or renewing the ticket without re-creating it. For example, the current service state information provided at step 406 may comprise a service ticket. At step 410, service provider 209 may modify expiration date 305A of the ticket and then send back the modified ticket as part of steep 412, described below. In this approach, a DVR that periodically calls service provider 209 can renew a ticket and never enter the second service state 304B or the third service state 304C.

In step 412, the service provider 209 cryptographically encodes the service ticket and sends the encoded service ticket to the DVR 204. Encoding the service ticket prevents a hacker, pirate or other unauthorized user from reading, obtaining or modifying the service ticket after the service ticket is received in the DVR 204 at step 414. In one example embodiment, encoding the service ticket at step 412 involves the following sub-steps:

1. Generate a hash of the entire service ticket 302 using a secure one-way hash algorithm, such as SHA-1, MD5, etc. Details about the SHA-1 and MD5 hash algorithms are described, for example, in B. Schneier, Applied Cryptography ($2^{nd}$ ed. 1995). The use of a hashing step is appropriate to reduce the amount of data processed in later encryption and signing steps, which can be time-consuming if applied to a large data element. In an alternative embodiment, in which the service ticket is relatively small, hashing could be omitted.

2. Encrypt the hash using public-key cryptography techniques based on the public key of the DVR 204 that was determined at step 408. For example, the RSA algorithm described in Schneier may be used to encrypt the hash. The level of security provided in the approaches herein may be changed by selecting a different size or length for the encryption key used to encrypt the hash. In one embodiment, keys in the range of 512 bits to 2048 bits are used. The use of a public key specific to the DVR 204 enhances security of the system, because a service ticket encrypted for one particular DVR will not work on a different DVR if an unauthorized user copies the service ticket and moves it to the different DVR.

3. Digitally sign the encrypted hash using a digital signature algorithm and a private signing key that is known only to the service provider 209. Digitally signing the encrypted hash enables the DVR 204 to determine, later, that the service ticket 302 actually came from the service provider 209 and was not generated or spoofed by an unauthorized party.

4. Append the signed, encrypted hash to the service ticket 302, so that the service ticket comprises both a cleartext version and the signed, encrypted hash.

FIG. 3B is a block diagram of a data structure that may result from the foregoing procedure. The data structure comprises the service ticket 302 of FIG. 3A and an encoded payload 305 that may be the signed, encrypted hash specified above. Additionally, in one embodiment the data structure optionally may include an issue date value 301 that indicates a date and time when the service provider created the data structure. Providing an issue date value 301 enables a DVR 204 to determine when a service state last changed, potentially displaying information to the user about how long it may take for the features of the service to be fully available.

Other embodiments may use other encoding processes. The particular form of encoding process is not critical. The data structure may also include cyclic redundancy check (CRC) data or other means for ensuring that the data structure is received in complete form. Sending the service ticket information in cleartext may seem to defeat the security goals of the techniques described herein. However, the present techniques are not concerned about man-in-the-middle attacks or that an unauthorized user might be able to temporarily use features, products or services of the DVR 204 or service provider 209. The complete approach described herein ensures that even if temporary unauthorized use occurs, the DVR 204 eventually reverts to a minimal service state that prevents ongoing authorized use. Further, by sending service state and expiration date information in cleartext in the service ticket, a receiving DVR can immediately begin to implement a new service state while concurrently validating and decrypting the signed, encrypted portion of the service ticket. Because validating and decrypting operations may take considerable time depending on the size of the keys used for encrypting and signing, this approach ensures that the vast majority of authorized users rapidly receive the features and services they are expecting, while the DVRs of unauthorized users eventually reach a minimal service state if the service ticket cannot be validated or decrypted.

At step 414, the encoded service ticket is received in the DVR 204. In step 418, a behavior set for the DVR is determined. In one embodiment, determining a behavior set involves mapping a service state value extracted from the service ticket to a behavior set of control values according to the techniques described above for FIG. 3A. As a result, the DVR creates and stores a current behavior set of control identifiers and control values.

In step 420, the behavior set is marked as non-secure. Marking the behavior set as non-secure informs the DVR that the decryption and validation process of step 416 is not yet complete. In step 422, the non-secure behavior set is sent to one or more client applications that are hosted in the DVR, such as DVR applications 314 of DVR 204. In one embodiment, DVR applications 314 (FIG. 3A) may elect not to use control values of a non-secure behavior set, or may elect to operate in a different manner than if the current behavior set is secure.

Additionally or alternatively, step 422 may comprise sending a message to the DVR applications 314 indicating that errors occurred in processing the behavior set or control values, without actually sending the set or values to the applications. In response, DVR applications 314 use a default behavior set. In one embodiment, DVR 204 hosts a software bus to which service processing logic 205 and DVR applications 314 are logically coupled. In an embodiment, the service processing logic 205 is implemented as a bus service. The service processing logic 205 processes the service ticket and the service map to create a behavior set, and sends the behavior set to each master client in each DVR application 314. The master clients then distribute the control values within each of the DVR applications 314 as needed. Additionally or alternatively, operating system 201 of DVR 204 may implement a library of functions that applications 314 can call to obtain behavior set values.

Referring now to FIG. 4B, the service ticket may be validated and decrypted in a parallel thread or process, while DVR applications 314 begin using the behavior set. At step 416, the service ticket is decoded in the DVR 204. As one example of step 416, in one embodiment, the following decoding procedure is used:

1. Validate the signed encrypted hash portion of the service ticket. Validation may be performed based on a key embedded in an operating system 201 of the DVR 204 that corresponds to the signing key used by the service provider.

2. Decrypt the encrypted hash portion. The result is an unencrypted hash value.

3. Generate a second hash value based on the cleartext portion of the service ticket, using the same hash function that was used at the service provider.

4. Compare the first hash value to the second hash value. If they are identical, the service ticket is valid. If they are not identical, the service ticket is forged, spoofed, contains unauthorized modifications, or is otherwise invalid.

Other embodiments may use other decoding processes.

If the decoding process is successful, as tested at step 432, then in step 434 the current behavior set is marked as secure. In step 436 the secure behavior set is sent, provided, or otherwise made available to one or more master clients of applications hosted in the DVR.

If the validation process is unsuccessful, then in step 438, the service state and behavior set are changed to provide minimal features, products or services and sent to the master clients associated with the applications. In effect, step 438 involves disabling the DVR 204 until the DVR connects to service provider 209 and obtains a valid service ticket containing a service state value for a higher level of service.

The minimal service state may be termed a "boat-anchor" state, because the DVR 204 is logically unable to move or provide useful services. In one embodiment, in boat-anchor state the DVR 204 provides minimal functions, while appearing to provide all functions. For example, in boat-anchor state the DVR 204 displays all conventional user interface menus and screens that are provided in a full service state. However, if a user selects one of the options shown in the screens, the DVR 204 displays a message on display device 211 indicating that service is not available. In one implementation, in boat-anchor mode no video recordings can be performed, a service dialog is triggered when any DVR function is selected, a "connection to service required" message is always displayed, and the boat-anchor state is specified in a system information display.

In contrast, a second service state 304B represented in service ticket 302 may comprise a level of functionality slightly higher than boat-anchor state. In one embodiment, manual recordings may be performed, and a limited number of days of program guide data is provided. Alternatively, the second service state may correspond to a free trial state.

In one embodiment, a timer process controls transitions from the first service state to the second service state, and from the second service state to the third service state. For example, control logic 205 periodically determines whether the first expiration date 305A has occurred. If so, then the current service state transitions to the second service state 304B. Thereafter, another periodic test is performed, based on a timer, to determine if the second expiration date 305B has arrived; if so, the current service state transitions to the third service state 304C. When a service state transition occurs, a new behavior set of control values is determined, and the new behavior set is sent to the master clients of the applications hosted in the DVR. In one embodiment, a timer process triggers a re-assessment of whether a service state transition is needed about every 20 hours. However, any other suitable time duration may be used for the same purpose.

Step 440 represents a master client of a DVR application 314 performing a timer process in parallel with the decryption and validation process. In general, if a master client does not receive a behavior set that is marked as secure within a specified time, the master client changes to a minimal or boat-anchor state. For example, if the decryption and validation process is not completed in a specified period of time, then control passes to step 442 and the master client or application changes to a minimal service state. An example timeout value is 10 minutes.

According to one embodiment, service map 306 is periodically communicated from the service provider 209 to the DVR 204. For example, DVR 204 periodically contacts service provider 209 according to an embedded schedule and requests service updates or new information from the service provider. The service provider 209 downloads an updated copy of the service map 306 to the DVR 204. In this way, the service provider 209 can add or change features, products or services that it offers for the DVR 204 and communicate these updated service offerings to the DVR. Moreover, the DVR 204 can adapt its behavior to changing service offerings of the service provider 209.

In one embodiment, the service map 306 is signed by the service provider 209 using a private signing key maintained at the service provider, and then sent to the DVR 204 in signed form. Each DVR persistently stores a public key corresponding to the private signing key. The DVR 204 validates the signature and stores the service map for use in re-configuring itself according to service state information received in a service ticket. Using this approach, a hacker cannot create and use an unauthorized service mapping.

The key server 210 is responsible for encrypting, signing, and distributing updated service tickets to individual DVR 204s when necessary. For example, during a periodic call to service provider 209, each DVR 204 tells the key server 210 the names of the service tickets it has stored in an internal repository or "key ring," but not the actual contents of the tickets. The key server 210 can sends back one or more ADD commands, instructing the DVR 204 to add a service ticket with a specified name and contents to its key ring, or DROP commands that instruct the DVR 204 to delete a service ticket with a specified name from its key ring. In one embodiment, the name of a service ticket includes an issue date and expiration date. Based on date values in service ticket names, key server 210 can determine whether a DVR 204 needs a new service ticket.

In yet another embodiment, a device may receive and maintain multiple service tickets, in which one service ticket is associated with a particular application. For example, DVR applications such as music and sound delivery, multi-room viewing, etc., each may have a separate service ticket. Using this approach, the service provider 209 can separately control different aspects of the DVR 204. In another embodiment, the service ticket 302 (FIG. 3A) may be extended to comprise a plurality of concatenated tickets, in which each ticket applies to a different one of the DVR applications 314. In this approach, each ticket within the extended ticket carries an application identifier that specifies one of the DVR applications 314 to which the ticket applies. Further, in yet another embodiment, the service map 306 may be carried within a service ticket 302. This approach enables the service provider to encode and deliver both the service map and a new service ticket in a single operation.

In still another embodiment, the service states 304A, 304B, 304C of service map 306 may specify particular DVR applications 314, for example, by application ID or name, rather than providing a mapping to behavior sets and control values. In this approach, for example, the service ticket 302 might comprise a service state 304A indicating "MP3 Player" and an expiration date 305 of "until Thursday." In response, DVR 204 would activate an MP3 Player application until Thursday, and then de-activate that application.

3.2 Satellite Service Provider Example

Figure 5:
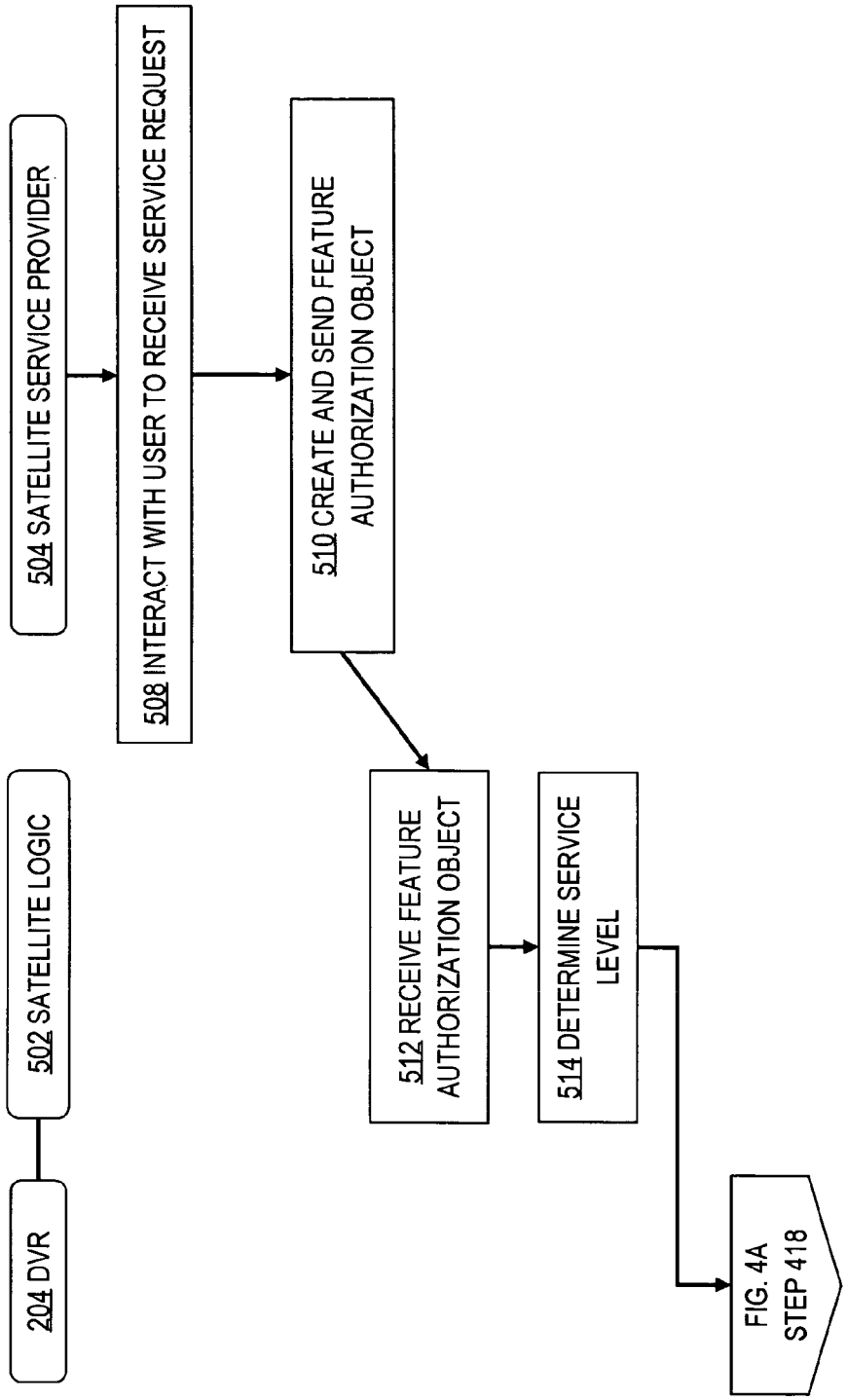
FIG. 5 is a flow diagram of another embodiment of a method for secure control of features of a digital device.

FIG. 5 is a flow diagram of another embodiment of a method for secure control of features of a digital device. The process of FIG. 5 is used in an embodiment in which a DVR is housed together with a satellite television receiver in one set-top box, and a satellite television service provider plays a role in determining what features, products or services the DVR provides to an authorized user or subscriber. Therefore, in FIG. 5, a DVR 204 also includes satellite logic 502 for decoding satellite television programming, performing satellite-driven program guide features, etc. Further, a satellite service provider 504 provides satellite television service.

In step 508, the satellite service provider 504 interacts with a customer to receive a service request, such as a subscription to satellite television service. The service request also may be an explicit request to receive a new service, feature or product offered by the satellite service provider.

In step 510, the satellite service provider creates and sends a feature authorization object to the device. In step 512, the feature authorization object is received by satellite logic 502. In response, the satellite logic 502 determines a service level for the DVR 204, at step 514, which may comprise using a "vault manager" element to determine a correct service state. The satellite logic 502 communicates the service level to the DVR. Processing then continues as described above for FIG. 4A, step 418, then step 434, and then subsequent steps.

Thus, in the embodiment of FIG. 5, the satellite service provider 504 and satellite logic 502 control what service state is used by the DVR, rather than the service provider 209. Thereafter, the DVR conforms its behavior to the service state specified by the satellite logic 502. This approach enables the satellite service provider 504 to dictate how the DVR will operate, which is appropriate because an authorized user of the DVR 204 generally has a customer relationship with the satellite service provider. The satellite service provider 504 maintains customer account records, payment information, and subscription level information about the authorized user, and is therefore best positioned to determine a service state for the user.

Security of the approaches of FIG. 4A, 4B, 5 may be enhanced by using secure communication links between the service provider and DVR. For example, referring to FIG. 4A, steps 402, 404, 406, 412 may involve communicating service state information over encrypted communication links or links that use proprietary protocols.

Using the approaches described herein, a service provider may securely enable or disable features, services or products delivered by a digital device that is remotely located with respect to the service provider or logically separate from it. A hacker who accesses the digital device cannot easily activate features or services. Even if the hacker succeeds in modifying a service state of the digital device, the digital device eventually moves to a state of minimal features or services until an authorized service state is received from the service provider. Further, the service provider can modify the behavior of the digital device remotely merely by downloading a new service ticket or service map, and without modifying application software that is installed in and running in the digital device. Thus, no client-side code changes are needed to change behavior of the digital device.

3.3 Information Incorporated by Reference

An implementation of the general techniques and approaches described herein may include various utility programs, software tools, and other elements that are not described in detail herein to avoid obscuring the invention. For example, an implementation may include software tools for generating keys, determining if pairs of service maps are different, etc. Examples of such tools are described in the documents "Spigot Tools" and "Spigot Maps and Tickets: Versioning and Management," which form a part of the provisional application disclosure that is cited herein, from which this disclosure claims priority, and which is incorporated herein by reference for all purposes as if fully set forth herein.

As described in the "Versioning and Management" document, version values may be associated with service maps to allow service provider 209 to deliver updates to maps that include new service states or levels, new control sets or new controls in existing control sets and service states or levels. The receiving digital device may ignore these new items, but otherwise perform all security checks as described above. This allows the service provider to maintain a single map for all versions of client software that have been released to digital devices in the field, and to change behaviors of all devices from a single managed map.

Further, version control provides the ability to associate special development "lineages" of maps with software that is undergoing development. These special maps are only delivered to the s/w to which that lineage applies. Once these changes are fully tested and approved, they are merged into the single map used for all production devices in the field, and distributed.

Further, an implementation may include many different kinds of control identifiers 310A and control values 312A. For example, an implementation can use the controls specified in the document "Behavior Set Proposal," which forms a part of the provisional application disclosure that is cited herein, from which this disclosure claims priority, and which is incorporated herein by reference for all purposes as if fully set forth herein, under the headings "Revised Controls," "Service Levels," and "Control Values by Service Level." The same document provides an example of control values that may be used in a minimal service state or boat-anchor mode, as described in the sections of the document entitled "Existing Boat Anchor Controls" and "Boat Anchor Mapping."

An example of a reduced-functionality state that may correspond to the second service state 304B of FIG. 3A is described in the document "Oxygen Service State Functional Specifications," which forms a part of the provisional application disclosure that is cited herein, from which this disclosure claims priority, and which is incorporated herein by reference for all purposes as if fully set forth herein.

APPENDIX 1 provides technical specifications for an implementation of a service map and software elements for processing the service map within a DVR.

In the foregoing documents, the term "Spigot" is a shorthand term used to broadly designate all aspects of a software project or service that provides one particular implementation of secure control of a digital device.

4.0 Methods that Generate Revenue for a Service Provider

Figure 6A:
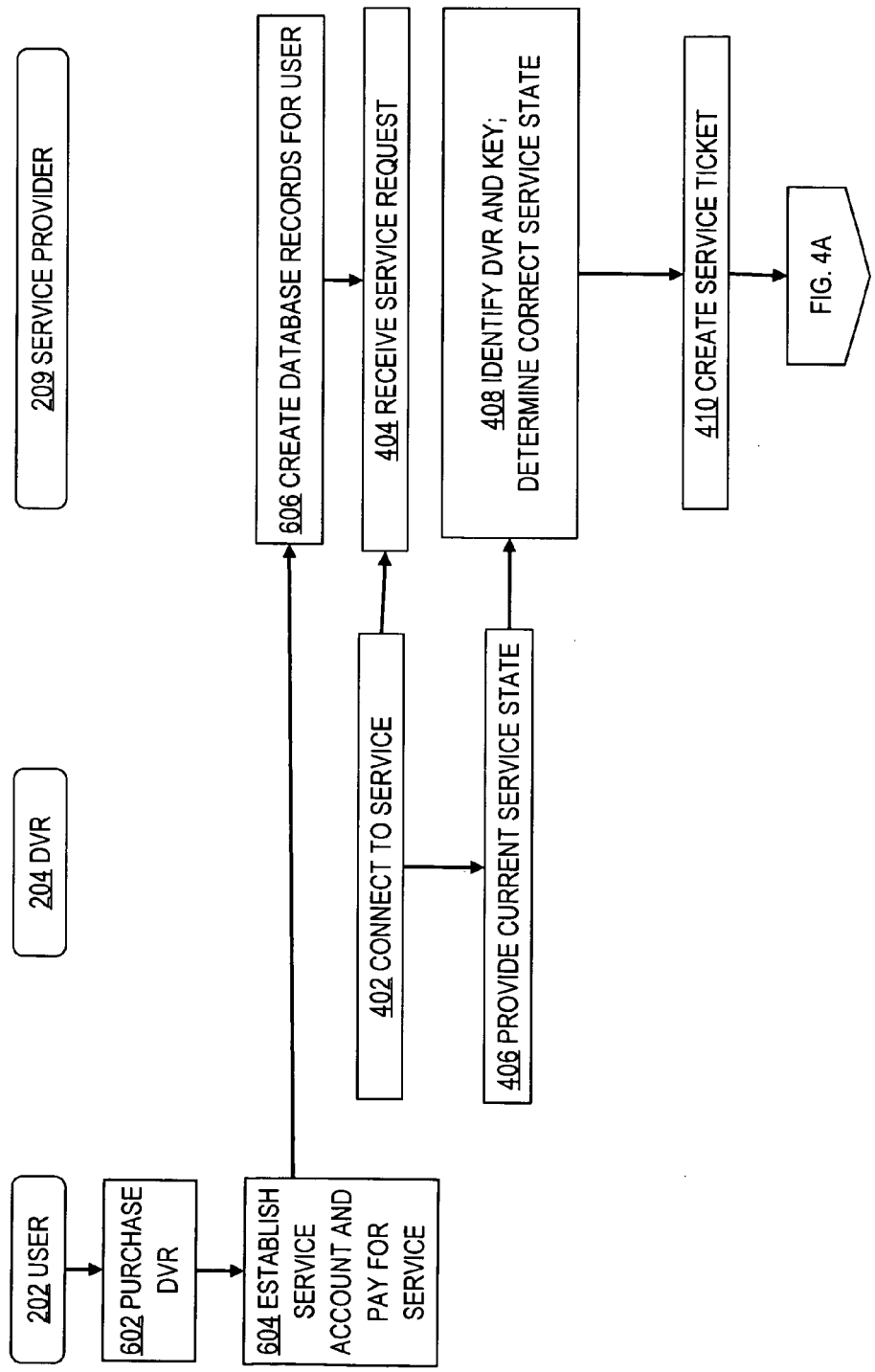
FIG. 6A is a flow diagram of yet another embodiment of a method for secure control of features of a digital device.
Figure 6B:
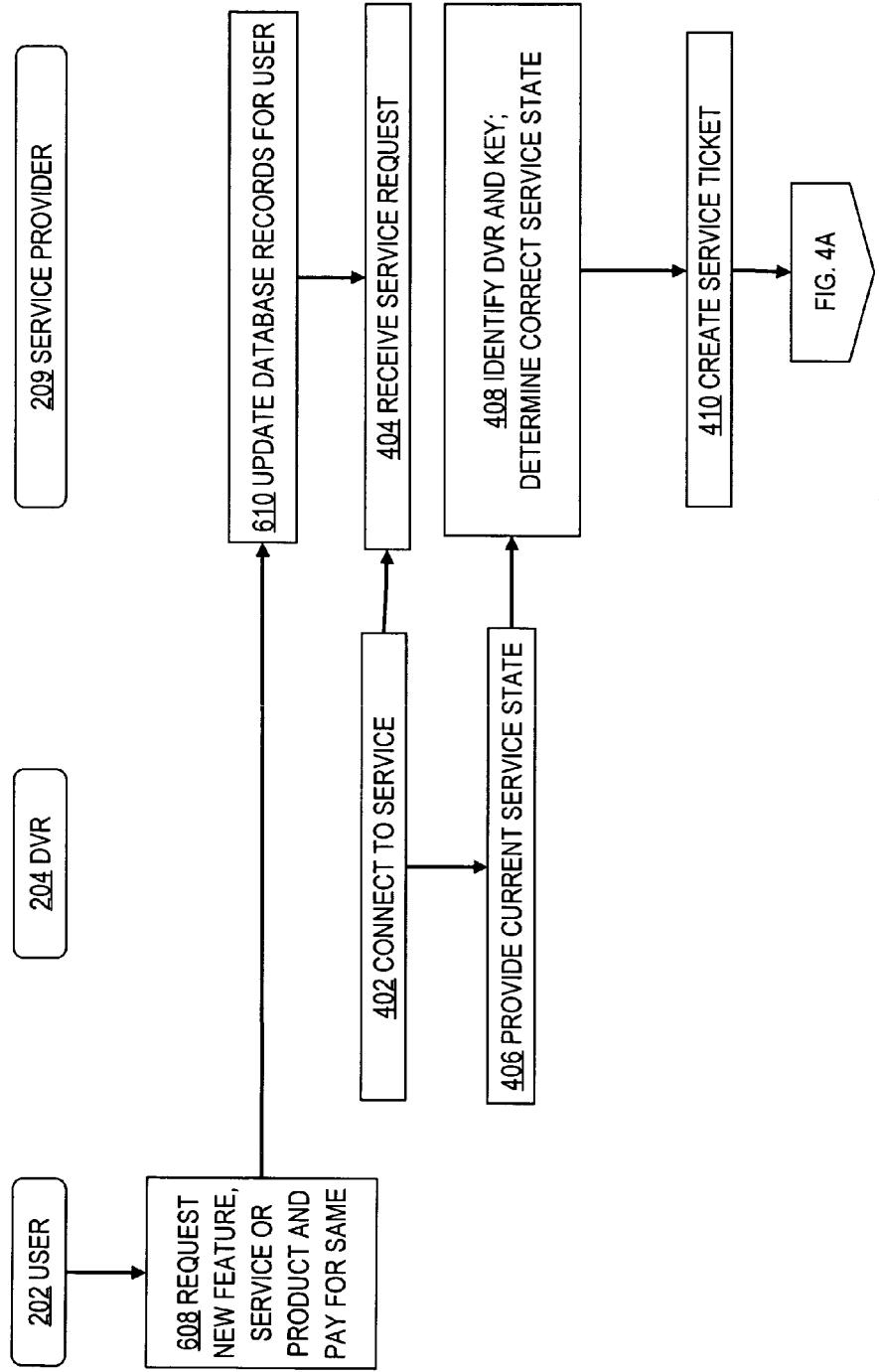
FIG. 6B is a flow diagram of still another embodiment of a method for secure control of features of a digital device.

Certain embodiments may involve or provide a flow of value from the user 202 to the service provider. FIG. 6A is a flow diagram of yet another embodiment of a method for secure control of features of a digital device; FIG. 6B is a flow diagram of still another embodiment of a method for secure control of features of a digital device. Referring first to FIG. 6A, in step 602, user 202 purchases DVR 204. Step 602 may involve any form of purchase, retail or direct, of DVR 204 such that value is transferred directly or indirectly from user 202 to service provider 209 in exchange for the DVR.

The user 202 may receive the DVR 204 in a pre-configured state such that the purchase price paid for the DVR includes one or more features, products or services provided by the DVR alone or in combination with service provider 209. Alternatively, the user 202 may receive the DVR 204 in a non-configured, base state. In either alternative, for the purpose of receiving program guide information or other value-added features, products or services from service provider 209, user 202 signs up for service and establishes an account with the service provider at step 604.

Optionally, signing up for service and establishing an account may include paying an additional service fee or subscription fee to the service provider. Step 604 also involves the user 202 providing identifying information. For example, user 202 may provide a serial number, unique name, or other value that uniquely identifies DVR 204 so that service provider 209 can associate a service account and/or payment with a particular DVR. User 202 may specify where the DVR 204 is located so that service provider 209 can return a local telephone number to the user. The user 202 then can configure DVR 204 to make a local telephone call to the service provider 209 for periodic updates, program guide information or to receive other services. Step 604 may be accomplished by the user 202 placing a telephone call to a customer service representative of the service provider 209, by the user interacting with the service provider through an automated interactive voice response system, through a Web application of the service provider that the user accesses over the internet with a Web browser, or any other suitable method.

At step 606, service provider creates an account and one or more records in database 208 associated with the user. The records may identify the user 202 and the DVR 204 that is associated with the user.

Thereafter, steps 402-410 proceed as specified in FIG. 4A. In step 408, determining a correct service state is performed by retrieving values from records in the database 208 that are associated with the DVR that is identified in step 408. Thus, in the method of FIG. 6A, service provider 209 determines what features, services or products the user 202 has ordered and paid for, and forms a service ticket based on the features, services or products that are authorized for the user. In this approach, the DVR 204 is given authority, through the service ticket, to activate and provide only those features, services or products that have been purchased by the user 202 either as part of purchasing the DVR at step 602 or paying for services at step 604. A hacker or other unauthorized user cannot cause the DVR 204 to provide, on a permanent basis, unauthorized features, services or products.

In addition, the techniques herein permit re-configuring the DVR 204 to provide additional features, services or products after the user 202 acquires the DVR and places it in service. Referring now to FIG. 6B, at some point in time after performing the steps of FIG. 6A, user 202 requests a new feature, service or product from the service provider and pays for it, at step 608. For example, using an online purchase facility or by calling a customer service representative, user 202 signs up for an additional DVR feature. Examples of added-on features or services include the TiVo Home Media Option, a larger number of Season Passes, etc.

In response, at step 610 the database records associated with the user 202 and DVR 204 are updated to indicate purchase of new features, services or products. In one embodiment, a new service state value of the type described above for FIG. 3A is stored in database 208 in a record associated with DVR 204.

Thereafter, steps 402-410 proceed as specified in FIG. 4A. In step 408, determining a correct service state is performed by retrieving values from records in the database 208 that are associated with the DVR that is identified in step 408. Thus, in the method of FIG. 6A, service provider 209 determines what additional features, services or products the user 202 has ordered and paid for, and forms a service ticket based on the features, services or products that are authorized for the user. Inheritance techniques may be used in the service state or level, so that the service ticket specifies the behavior set previously held by the DVR 204 in addition to the features that have just been added.

Accordingly, the DVR 204 is given authority, through the service ticket, to activate and provide the newly ordered features, services or products. However, the service ticket carries a service state value that authorizes using only features, services or products that have been purchased, paid for or otherwise acquired by the user 202 with authorization from the service provider 209.

5.0 Implementation Mechanisms

Hardware Overview

Figure 7:
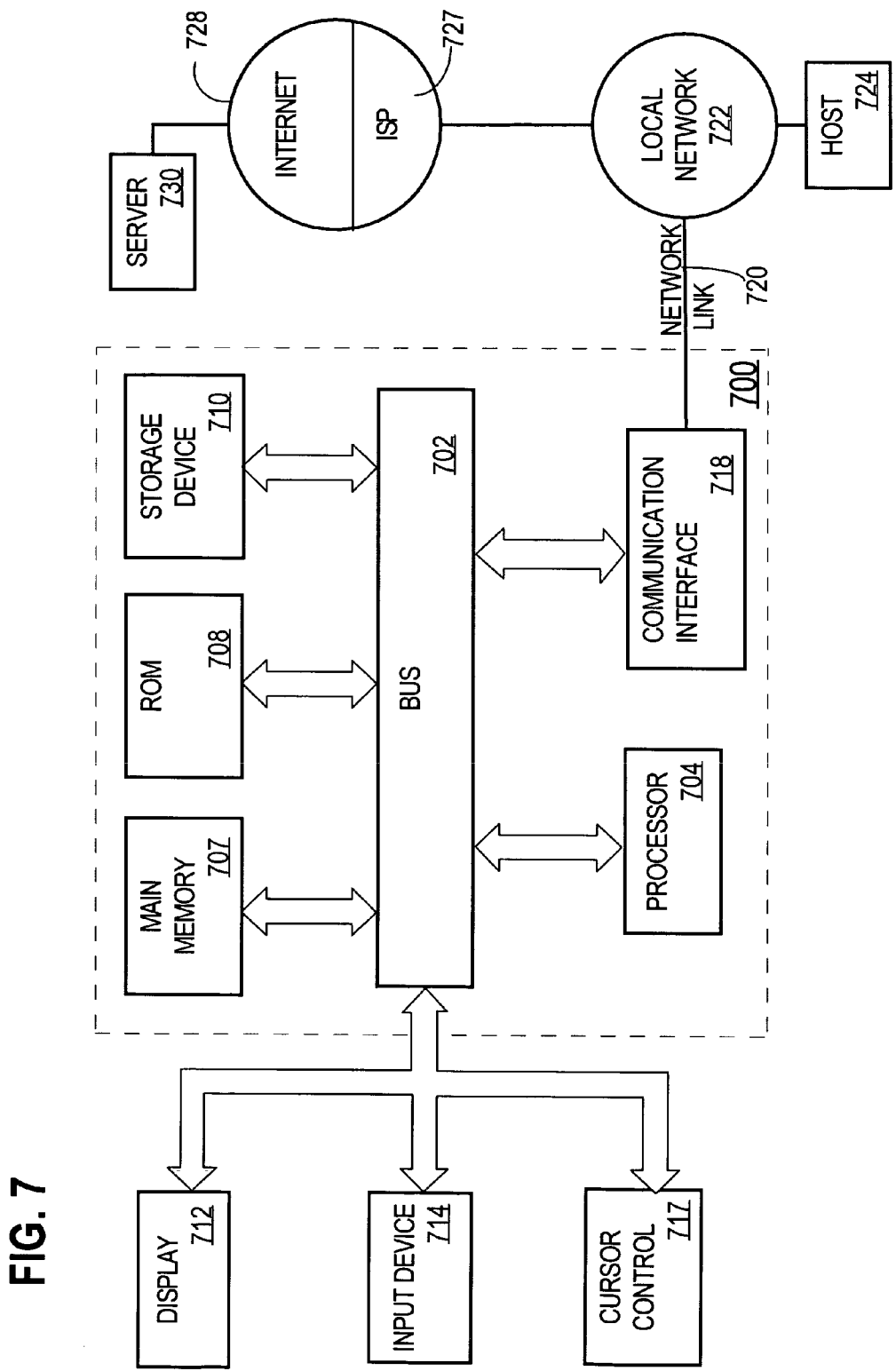
FIG. 7 is a block diagram that illustrates a computer system upon which an embodiment may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, trackball, stylus, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for secure control of features of a digital device. According to one embodiment of the invention, secure control of features of a digital device is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infrared transmitter to convert the data to an infrared signal. An infrared detector can receive the data carried in the infrared signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the worldwide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for secure control of features of a digital device as described herein.

The received code may be executed by processor 704 as it is received, and/or stored in storage device 710, or other non-volatile storage for later execution. In this manner, computer system 700 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX 1

Service Map Implementation Example

Overview

This document describes a mechanism for providing secure control over the behavior of DVRs in the field. The mechanism is built around the concept of an Active Behavior Set—a cohesive and internally consistent collection of values that can be tested by an application (such as myworld) to tailor its behavior to provide a specific level of service.

The individual values are stored in TiVo Controls. A Service Map Definition File declares each TiVo Control and it's storage class.

At this time, an Active Behavior Set may be populated with values in one of two ways:

The Map and Ticket Method: additional entries in Service Map Definition File are used to group sets of values for the TiVo Controls into Behavior Sets, then associate the Behavior Sets with Service Levels. A binary version of this set of definitions is delivered to the DVR in binary form as a Service Map. In addition, an Application Authentication Token is associated with the application and delivered to the DVR separately. The token contains an Active Service Level, which is used to select a Service Level, and hence a Behavior Set, from the Service Map. The selected Behavior Set becomes the Active Behavior Set. Updated Service Maps and Authentication Tokens can be delivered to the DVR at any time.

The Enumerated Control Method: the Service Map Definition File simply declares an arbitrary set of TiVo Controls. Additional code is then be added to the Service Map Processor, in the form of a Map Handler, that dynamically generates new Active Behavior Sets that contain the same set of controls based on external resources. Assigning meaning to each control is the domain of the developer of the application and the handler, as is the responsibility for keeping them synchronized.

DEFINITIONS

Note: If an item includes the string (M&T), it applies only to the Map And Ticket Method for generating Active Behavior Sets.

Supported Application—any body of code which implements the mechanisms defined herein (such as myworld or a third party application).

Application ID—An immutable string of characters, which uniquely identify a Supported Application.

Service Map Definition File—a clear text file which defines TiVo Controls and groups them into Behavior Sets and associates these sets with Service Levels. A unique Definition File will exist for each Supported Application. Hereafter, this file will be referred to as the Definition File.

Service Map—(M&T) A signed binary file representation of the Definition File, suitable for delivery via the daily call. A Service Map for each Supported Application will be installed into the database on each DVR.

Service Level—(M&T) An arbitrary sequence of characters representing the level of service that should be provided to the customer. Each Supported Application may declare it's own set of Service Levels.

Active Service Level—(M&T) The Service Level determined by decrypting and parsing the Application Authentication Token.

Application Authentication Token—(Also known as a Ticket.) (M&T) The Ticket is a key stored on the DVR's keyring. The ticket contains a set of three Service Levels and two Dates. The first Service Level is selected as the Active Service Level up to the first date, after which the second Service Level is made the Active Service Level. Once the second date has passed, the third Service Level becomes the Active Service Level. The ticket is encrypted by the Service using the individual DVR's private key prior to its being delivered during the daily call.

TiVo Controls—tokens representing boolean or numeric values which are used to regulate the behavior of an application. Each individual TiVo Control must be declared in the Definition File.

Behavior Set—a collection of specific values for each TiVo Control. Each Behavior Set must be defined in the Definition File.

Active Behavior Set—the current set of TiVo Control Values constructed by the Service Map Processor for a specific application. In the M&T method, the ABS is constructed from individual Behavior Sets defined in the application's Definition File based on the Active Service Level.

Service Map API—The source code and header files that are compiled and linked into myworld or a third party application and provide a mechanism for determining TiVo Control values from elsewhere in the application. Portions of the API are generated by parsing the Definition File.

Service Map Processor—The TvBus component which generates Active Behavior Sets. For Map and Ticket based applications, it implements the validation and decryption of the Application Authentication Token, the validation of the Service Map. For Enumerated Control applications, a Map Handler compiled into the Service Map Processor performs all tasks necessary to generate an Active Behavior Set.

The Service Map Definition File

The Service Map Definition File is the central component. Each application will have it's own version of this clear text file, which defines the four required sets of information necessary to implement Service Maps:

Application and Version Control Information
TiVo Controls
Behavior Sets
Service Levels Note: even though applications that use the Enumerated Control method will not use Behavior Sets and Service Levels directly, it is required that at least one Behavior Set and one Service Level be defined. This is expected to be the DEVELOPMENT Service Level, and discussed above under Fallback Active Behavior Set.

Application and Version Control Info

Each Supported application must declare a unique and immutable Application ID. This ID is a short alphanumeric string which must correspond to the Application ID used in the Application Service Token's key name as well as the Service Map's name. The ID appears in the Definition File thus:

ApplicationID TWO

A Version Number must be declared. This numeric value will be used by the Service Map Processor to ensure that an incoming Service Map corresponds with the header files used when the application was compiled. This number must be incremented every time TiVo Controls are added, removed or repurposed, since it provides the sole method for keeping the compiled-in Service Map API in sync with the Service Map delivered via the service. In addition, the Version Number must match the Version Number present in the Application Service Token. The Version Number appears in the Definition File thus:

Version 1

Additionally, a Modification Level may be declared. This numeric value is not used for any version control, it is simply included in any messages that are generated regarding the Service Map, and may be useful in problem resolution. For example:

Modification Level 1

TiVo Controls

TiVo Controls are tokens used to represent values used to regulate the behavior of the application. Each individual TiVo Control must be declared in the Definition File and assigned a control ID.

A default value must be provided for each control. For Map and Ticket applications, these defaults define the starting point from which the Active Behavior Set is built up.

For Map and Ticket applications, any control may be defined as 'NoCache'. This effectively disables the caching of the control's value. This only has importance during application initialization. Since it can take some time (45 seconds—two minutes) to decrypt and signature check the Service Map and Application Authentication Tokens, the Service Map Processor will cache the current Active Behavior Set into the database each time a new set is generated. The cached Active Behavior Set is retrieved during application initialization and referenced until such time as the Application Authentication Token and Service Map are available for use, at which time the cached values are discarded and a new Active Service Map is generated. The 'NoCache' attribute causes the control to become false/zero, irregardless of the contents of the Cached Active Behavior Set, until a new Active Behavior Set is generated from the current Service Map and Application Authentication Token.

For Example:
Control {enablePVR 0 bool false NoCache}
Control {EnableAdverts 1 bool true}
Control {WarnOutOfData 2 bool false}
Control {MaxSeasonPasses 5000 S8 4}

Behavior Sets

Behavior Sets are collections of zero or more TiVo Control values, which override the default values. Each Behavior Set is given a name, which can be called for within the definition of Service Level Sets. Behavior Sets can also include other Behavior Sets in a embedded fashion.

For Example:
Behavior Set {Basic
EnablePVR true
}
Behavior Set {Premium
IncludeBehavior Set Basic
MaxSeasonPasses 32767
EnableAdverts false
}

The Active Behavior Set is constructed by starting with the default settings for all TiVo Controls then working forward through each pertinent Behavior Set definition, updating values.

Service Levels

Service Level definitions equate a Service Level coming from the Application Authentication Token with specific Behavior Sets.

ServiceLevel {DVR Basic}
ServiceLevel {PVR Premium}

In addition to the Service Levels that might originate in the Application Authentication Token, one may optionally define a DEVELOPMENT Service Level. This Service Level is only available in a development build. If a DEVELOPMENT Service Level is defined, then the TiVo Control values in the indicated Behavior Set are used as the fallback values instead of the false/zero. See a discussion of fallback values in the Section entitled 'Missing or Corrupt Application Authentication Tokens or Service Maps' in the Miscellaneous Issues section below. A Development Service Level would be coded thus:

ServiceLevel {DEVELOPMENT Basic}

Processing the Service Map Definition File

The Service Map Definition File is used to generate three files:

1) A header file which defines the ControlIDs and other constants used in making subroutine calls to the Service Map API. This header file must be included in any source file that may interrogate TiVo Controls, and well as the source file that instantiates the TvServiceMap Object.

2) A header file which contains a static definition of the Fallback Active Behavior Set. This header file must be included in the source file which instantiates the TvServiceMap Object.

3) The binary Service Map file. For the Map and Ticket Method, this file will be signed by TiVo using the Application's private signature key and delivered to each DVR through the TiVo Service. The file contains a binary representation of key elements of the Service Map Definition File, assembled such that it can be quickly and easily parse by the Service MAP API and the Core Routines. The Service Map's file name is generated from the Application ID and the Version Number defined within the source Definition File. For example, if the Application ID were TWO and the version Number were 15, the filename would be SM_TWO__15.

Implementing Service Maps

To ensure good performance, Service Map processing is performed in two separate threads. The first thread in provided by the application when it calls the Service Map API. Actions performed within the Service Map API are guaranteed to be quick and non-blocking (with the sole exception of the Initialize( ) method). Additionally, the TvServiceMap object will register an event handler with the application's MainLoop so that incoming Active Behavior Sets can be handled in a timely fashion. This processing is also quick and non-blocking.

The second thread runs through the ServiceMap Processor, which is a TvBus component. It is in this thread that the time consuming ticket decryption and other information gathering steps occur.

The Service Map API

The Service Map API provides the application with the public interface to the entire Service Map mechanism. With the exception of the Initialize( ) method, the Service Map API is non-blocking.

The API is exposed through three header files. The first two header files are generated from each application's Service Map Definition File.

In the TvServiceMapDefines.h header file. names are given to key elements of the Definition file, which are then used as parameters to the various calls made into the Service Map routines. For example:
const char[ ] SERVICEMAP_APPLICATIONID="TIVO";
const int SERVICEMAP_VERSIONNUMBER=1;
const int SERVICEMAP_MODIFICATIONLEVEL=1;
const int SERVICEMAP_CONTROL_enablePVR=0;
const int SERVICEMAP_CONTROL_EnableAdverts=1;
const int SERVICEMAP_CONTROL_WarnOutOfData=2;
const int SERVICEMAP_CONTROL_MaxSeasonPasses=5000;

A header file, TvServiceMap.h, is common among all applications, and defines the Service Map API's C++ objects and methods. All interaction with the Service Map occurs through an object of type TvServiceMap, which is defined thus:
class TvServiceMap
{
TvServiceMap(
TmkMainLoop* pMainLoop,
);
TvStatus Initialize(
const char *applicationId,
const int versionNumber,
const int modificationLevel
);
void Refresh(void);
bool GetBool(const int controlId);
S32 GetS32 (const int controlId);
TvStatus Status(int &statusCode);
~TvServiceMap(void);
};

When instantiating the TvServiceMap object, the code must provide a pointer to the application's TmkMainLoop object and must refer to the constants defined in the TvServiceMapFallback.h header file:
ref <TvServiceMap> serviceMap=
new TvServiceMap(
MyMainLoop::Get( )
;

If no Fallback is desired, the second and third parameters may be NULL and 0, respectively.

Initialize( )

This method must be called first, presumably early in the initialization of the application. The application must pass in the Application ID, the Service Map Version Number, and the Service Map Modification Level. The Initialize( ) method will establish contact with the Service Map Processor and recover the cached copy of the last Active Behavior Set, establishing the initial TiVo Control values. The call will block until the ServiceMap Processor either returns the cached Active Behavior Set or sends a message indicating that no cached map exists. If no message arrives within ten seconds, a severe error must have occurred within the Service Map Processor. All values will fallback to false/zero (or the contents of the DEVELOPMENT service level.)
serviceMap->Initialize(
SERVICEMAP_APPLICATIONID,
SERVICEMAP_VERSIONNUMBER,
SERVICEMAP_MODIFICATIONLEVEL);

Refresh( )

This method is responsible for updating the in-memory TiVo Control values to reflect a transition to a new Active Behavior Set. This method may be called by the application anytime after the TvServiceMap object is initialized. It should be called at somewhat regular intervals, but only at the point where it is reasonable for a completely new set of TiVo Control values to come into play. For myworld, that may be whenever the user returns to TiVo Central.
serviceMap->Refresh( );

GetBool
GetS32

After the Initialize( ) method call, it is safe to begin interrogating TiVo Controls. For example, to branch based on the value for enablePVR, the source code would be:
if   (serviceMap->GetBool(SERVICEMAP_CONTROL_enablePVR)) { . . . }

These routines will always return a value, and will never assert. If an Active Behavior Set exists, the values will be pulled from that set, otherwise they will return false/zero.

Status( )

This method may be called at any time to ascertain the status of the Service Map API. int status;
TvStatus s=serviceMap->Status(status);

The status values are defined in TvServiceMap.h:
SERVICEMAP_ABS_NEWLY_MINTED
SERVICEMAP_ABS_CACHED
SERVICEMAP_NO_CACHED_MAP
   SERVICEMAP_NO_VALID_CONFIG_FILE
SERVICEMAP_NO_VALID_TICKET
SERVICEMAP_NO_VALID_SERVICEMAP
SERVICEMAP_NO_VALID_MAP_OR_TICKET
SERVICEMAP_TIMEOUT_ERROR
SERVICEMAP_SEVERE_ERROR If status( ) returns TV_OK, either a Newly Minted, cached, or fallback ABS is in place. If TV_FAILURE is returned, expect all GetBool( ) and GetS32( ) calls to return false/zero.

~TvServiceMap( )(the class destructor)

When an application no longer needs access to its Service Map, the object should be deleted. All internally allocated memory will be freed, the connection with the Service Map Processor will be closed.

Background Processing and The Service Map Processor

Since it is mandatory that the TvServiceMap methods that are called by the UI be non-blocking, most of the 'meat' of handling Service Maps must happen in the background. All the encryption and signature checking occurs in the Service Map Processor, which is implemented as a TvBus Component. Each instance of the TvServiceMap object will establish a connection to the Service Map Processor. The application needs to call the Refresh( ) method on a regular basis to enact any changes that result from normal Service Map Processor behavior.

The Service Map API will maintain two Active Behavior Sets in memory—the current set and the candidate set. The current set always exists and contains the values which are to be returned by the interrogation methods. The candidate set is created and refreshed asynchronously based on messages sent from the ServiceMap Processor to the TvServiceMap object. The Refresh( ) method simply checks to see if a candidate set exists, and if so, discards the current set and makes the candidate set the new current set.

When using the Map and Ticket Method, if the Service Map Processor finds it necessary to generate a new Active Behavior Set, it will cache a copy of it in the database. Next time the application starts up it will call the TvServiceMap Initialize( ) method, which will attempt to load the cached version of the Active Behavior Set from the database. The Service Map API expects that this cached version of the database will only be used until the Service Map Processor returns a newly minted Active Behavior Set. It is unforeseeable that it will take more than ten minutes for this to occur. To ensure that the DVR does not operate indefinitely using the cached set, each call to the Refresh( ) method will check the time, and if it has been more that ten minutes since the Initialize( ) method was called and we are still using the cached set, the cached set will be discarded and the object will revert to either the DEVELOPMENT Active Behavior Set or false/zero for all controls. The actual timeout value is hardcoded in the TvServiceMap.h file as SERVICEMAP_TIMEOUT. If this situation occurs, the Status( ) method will return a status of SERVICEMAP_TIMEOUT_ERROR.

When the Service Map API receives an Initialize( ) method call, it will open a connection with the processor and send a register event for the calling application. For the Map and Ticket Method, this event results in the following actions in the processor:
1) Look for a cached version of the Active Behavior Set for this application, and load it if present.
2) Place 'watches' on the database for notification if the Application Service Token or the Service Map change.
3) Returns the cached Active Behavior Set (if available) to the caller.
4) Instantiate a Map Handler object on behalf of the application.

On a regular basis the Service Map Processor will call the ProcessMap method of the Map Handler object. For Map and Ticket applications, the handler performs the following actions:
1) Check the database 'watches' for this application, and if they have changed (or have not yet been loaded), then the latest versions of the Application Authentication Token and Service Map are loaded into memory.
2) If not already performed, decrypt and signature check the Application Authentication Token
3) If not already performed, signature check the application's service map.
4) Review the dates contained in the Application Authentication Token and determine the Active Service Level.
5) If any of the above steps require it, Use the Active Service Level to parse the in-memory Service Map for that application and generate a new Active Behavior Set. The new Active Behavior Set is cached into the database and returned to the caller.

When the TvServiceMap object is destroyed, the destructor will close the session with the Processor, and the Processor will release all memory associated with the application.
Map Handlers To give the ServiceMap Processor greater flexibility in how Active Behavior Sets are generated, the ServiceMap Processor can instantiate different Map Handlers. The selection of which handler to use for which application will eventually be driven by external data, but for the time being the selection is hardcoded in the TvServiceMapComponent.C source file, based on the applicationId. Map Handler objects are concrete classes derived from the abstract TvServiceMapHandler class. The class definition should look like this: class TvServiceMapHandlerEnumerator: public TvServiceMapHandler
{
public:
TvServiceMapHandlerEnumerator(
TmkMempool *mempool,
UpdateProc pUpdateProc,
void *pClientData,
ref<TmkLogger>pLogger
);
~TvServiceMapHandlerEnumerator( )
TvStatus Init(
TmkString &appIdString
);
void ProcessMap(void);
S32 NextCallBack(void);
};

The TvServiceMapHandler object provides a UpdateProc callback method, which the derived class may call at any time to send a TvServiceMapUpdate message back to the client. The Init( ) method will be called immediately after the object is instantiated. What occurs in the Init( ) method is handerspecific, but it should involve taking care of all initialization steps. In the MapAndTicket handler, the cached ABS is recovered and sent back to the client, and watches are placed on the ServiceMap and Ticket in the database. The Init method MUST send at least one TvServiceMapUpdate message back to the client before returning. The ProcessMap( ) method will be called on a regular basis. The handler should review all outstanding watches or other external resources. If changes have occurred, the handler should generate an updated ActiveBehavior Set and send a copy of it to the client by passing it to the UpdateProc. The MapAndTicket handler reviews all database watches, decrypting and signature checking as required. It will also cache the most recent ServiceMap and the current Active Service Level in the database.

The NextCallBack( ) method will be called after the ProcessMap( ) methods for all open sessions have been called, and after a new session is created. The method should return an integer representing how long this handler is willing to wait, in milliseconds, before it requires that it's ProcessMap( ) method be next called. This value is used to establish a timer callback. Note that is value is used as guidance to the ServiceMap Processor—the ProcessMap( ) function may be called sooner or (hopefully not much) later than the requested time.

If the client closes the session with the TvBus, the handler will be destroyed.
Structure of the Active Behavior Set and Service Map The TvServiceMapActiveBehavior Set object is a collection of arrays. Methods are provided for getting and setting the various values. An Export method exists which creates a serial byte stream representation of the object. It is this byte stream which is passed across the TvBus. The util/packer.h tool is used to export and import the data to/from this form. A Service Map is encapsulated in a TvServiceMapCase object. The object contains a single TvServiceMapActiveBehavior Set object and one or more TvServiceMapFragment, TvServiceMapBehavior Set, and TvServiceMapServiceLevel objects. TvServiceMapCase has a method that takes a Service Level as a parameter and returns a pointer to a newly created TvServiceMapActiveBehavior Set object which contains the appropriate control values. An Export method exists which creates a serial byte stream representation of the object. It is this byte stream which is signed as transmitted from the Service to each DVR. The util/packer.h tool is used to export and import the data to/from this form.

Use by Third Party Developers

The Service Map API has no requirements of other ISMs except for sw/tmk (for memory and thread management). Assuming each third party has it's own Service Map and Application Authentication Token, third party apps could utilize Service Maps within their application.

Miscellaneous Issues

Missing or Corrupt Application Authentication Tokens or Service Maps

When an application initializes the Service Map API, the Service Map Processor will try to find a Application Authentication Token and a Service Map for the application in the database. If the Processor is unsuccessful, the ServiceMap API will fall back to returning false/zero for all controls.

There is one exception: If the application was built with DEBUG and a Service Level named DEVELOPMENT was defined in the Definition File, then the control values defined for that Service Level will become the current control values.

Service Map Version Mis-Matches

This implementation expects an exact match between the Version Number found in a Service Map and the Version Number passed in to the API's Initialize( ) call. If an exact match cannot be found, then the map is considered corrupt.

What is claimed is:

1. A method, comprising:
sending, from a digital device that participates in a service, to a service provider that provides the service, a request to participate in the service;
receiving, by the digital device, a digital message that identifies a desired service state for the digital device, wherein the digital message is encoded uniquely for the digital device and at least a portion of the digital message is encrypted using a public key that is uniquely associated with the digital device to result in creating an encrypted one way hash and the encrypted one way hash is digitally signed using a signing key unique to the service provider, to result in creating an encrypted signed hash that is appended to the digital message, wherein the digital message is unusable at a different digital device;
based on the digital message, determining, by the digital device, a plurality of control values that collectively define the desired service state within the digital device the plurality of control values indicate specific capabilities of the digital device that are enabled, disabled, or set to particular values depending on the features, services or products represented in the digital message;
providing the plurality of control values to one or more applications hosted by the digital device that deliver a service experience associated with the desired service state, or at least a feature associated with the desired service state, thereby placing the digital device into a first service state;
marking the control values as non-secure at the digital device;
marking the control values as secure only after the digital device successfully decrypts the at least a portion of the digital message that is encrypted; and
changing the digital device to a second service state if the control values are not marked as secure.

2. A method as recited in claim 1, wherein the at least a portion of the digital message is encrypted using a public key that is unique to the digital device.

3. A method as recited in claim 2, wherein the digital message is digitally signed using a signing key of the service provider.

4. A method as recited in claim 1, wherein the digital message is digitally signed using a signing key of the service provider.

5. A method as recited in claim 1, wherein the digital message comprises (a) one or more sets of desired service state identifiers and expiration values in cleartext and (b) an encrypted version of the cleartext.

6. A method as recited in claim 5, wherein the determining step comprises determining the plurality of control values based on the cleartext of the digital message and concurrently decrypting the encrypted version.

7. A method as recited in claim 1, wherein the
changing step changes the digital device to a second service state if the control values are not marked as secure before expiration of a specified time.

8. A method as recited in claim 1, wherein the digital message comprises a first service state identifier representing a full service state, a first expiration time value associated with the first service state identifier, and a second state identifier representing a limited service state; and further comprising the steps of:
based on the first service state identifier, determining a plurality of control values that collectively define the full service state within the digital device;
providing the control values to one or more applications hosted by the digital device that deliver a service experience associated with the full service state;
determining that a current time is equal to or greater than the first expiration time value; and
changing the digital device to the limited service state based on determining new control values based on the second state identifier.

9. A method as recited in claim 8, wherein the second state identifier specifies a minimal service state.

10. A method as recited in claim 1, wherein the second service state is a limited service state.

11. A method as recited in claim 1, further comprising receiving an issue date value as part of the digital message, and generating and displaying a message indicating how long the digital device needs to implement the service state.

12. A method, comprising:
storing, by a server, a record of the payment for a service in which a digital device can participate in a database associated with a service provider that provides the service, wherein the record is uniquely associated with the digital device;
receiving, at the server from the digital device, a request from the digital device to receive the service;
based on the database record, determining, by the server, a desired service state value for the digital device corresponding to the service that was paid for;
encoding, by the server, the desired service state value in a digital message, wherein the digital message is encoded uniquely for the digital device, wherein the digital message is unusable at a different digital device, by:
creating and storing a digital one-way hash of the digital message;
encrypting the one-way hash of the digital message using a public key that is uniquely associated with the digital device, to result in creating an encrypted hash;
digitally signing the encrypted hash using a signing key unique to the service provider, to result in creating an encrypted signed hash;

appending the encrypted signed hash to the digital message;

wherein the digital message carries a plurality of control values that collectively define the desired service state that the digital device is authorized to use; securely authorizing, by the server, the plurality of control values that are enabled, disabled, or set to particular values depending on the features, services or products represented in the digital message; and sending the digital message to the digital device that delivers a service experience associated with the service, or a feature, to an end user of the digital device.

13. A method of securely enabling features of a digital video recorder, the method comprising the computer-implemented steps of:

storing, by a server, a record of payment for a service in which a digital device can participate in a database associated with a service provider that provides the service, wherein the record is uniquely associated with the digital device;

receiving, by the server, a request from the digital device to receive the service;

based on the database record, determining, by the server, a desired service state value for the digital device corresponding to the service that was paid for;

encoding, by the server, the desired service state value in a digital message, wherein the digital message is encoded uniquely for the digital device, wherein the digital message is unusable at a different digital device, by:

creating and storing a digital one-way hash of the digital message;

encrypting the hash of the digital message using a public key that is uniquely associated with the digital device to result in creating an encrypted hash;

digitally signing the encrypted hash using a signing key unique to the service provider, to result in creating an encrypted signed hash;

appending, by the server, the encrypted signed hash to the digital message;

sending the digital message from the server to the digital device;

based on the digital message, determining, by the digital device: a plurality of control values that collectively define the desired service state within the digital device, the plurality of control values indicate specific capabilities of the digital device that are enabled, disabled, or set to particular values depending on the features, services or products represented in the digital message; and providing the plurality of control values to one or more applications hosted by the digital device that deliver a service experience associated with the service, or a feature, to an end user of the digital device.

14. A non-transitory computer-readable medium storing one or more sequences of instructions for securely enabling features of a digital device, which instructions, when executed by one or more processors, cause the one or more processors to carry out the steps recited in any of claim 1, 2, 4, 5, 6, 7, 10, 8, 9, 11, 12, 13, or 3.

15. An apparatus for securely enabling features of a digital device, comprising means for performing the steps recited in any of claim 1, 2, 4, 5, 6, 7, 10, 8, 9, 11, 12, 13, or 3.

16. An apparatus for creating and storing troubleshooting information for diagnosing one or more problems experienced in one or more completed voice calls that are carried by a packet-switched data network, comprising: a network interface that is coupled to the data network for receiving one or more packet flows therefrom; a processor; one or more stored sequences of instructions which, when executed by the processor, cause the processor to carry out the steps of any of claim 1, 2, 4, 5, 6, 7, 10, 8, 9, 11, 12, 13, or 3.

* * * * *